US009131169B2

(12) United States Patent
Nagumo et al.

(10) Patent No.: US 9,131,169 B2
(45) Date of Patent: Sep. 8, 2015

(54) APPARATUS, LICENSE DETERMINING METHOD, RECORDING MEDIUM

(75) Inventors: Taku Nagumo, Kanagawa (JP); Yuuko Sugiura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 1400 days.

(21) Appl. No.: 12/535,170

(22) Filed: Aug. 4, 2009

(65) Prior Publication Data

US 2010/0058482 A1    Mar. 4, 2010

(30) Foreign Application Priority Data

Aug. 29, 2008 (JP) .................................. 2008-222132

(51) Int. Cl.
*H04N 1/32* (2006.01)
*H04N 1/00* (2006.01)

(52) U.S. Cl.
CPC ....... *H04N 1/32106* (2013.01); *H04N 1/00912* (2013.01); *H04N 1/00962* (2013.01); *G06Q 2220/18* (2013.01); *H04N 2201/0094* (2013.01); *H04N 2201/3204* (2013.01); *H04N 2201/3274* (2013.01); *H04N 2201/3281* (2013.01)

(58) Field of Classification Search
CPC . G06F 21/10; G06Q 2220/18; H04N 1/32106
See application file for complete search history.

(56) References Cited

U.S. PATENT DOCUMENTS

| 5,260,999 A | * | 11/1993 | Wyman | 705/59 |
| 5,692,129 A | * | 11/1997 | Sonderegger et al. | 1/1 |
| 5,859,978 A | * | 1/1999 | Sonderegger et al. | 709/226 |
| 5,956,505 A | * | 9/1999 | Manduley | 713/1 |
| 5,970,252 A | * | 10/1999 | Buxton et al. | 717/166 |
| 6,363,486 B1 | * | 3/2002 | Knapton, III | 726/7 |
| 6,499,035 B1 | * | 12/2002 | Sobeski | 1/1 |
| 6,513,121 B1 | * | 1/2003 | Serkowski | 726/29 |

(Continued)

FOREIGN PATENT DOCUMENTS

| JP | 2004-139149 | 5/2004 |
| JP | 2004-213469 A | 7/2004 |

(Continued)

OTHER PUBLICATIONS

Japanese Office Action issued Oct. 23, 2012 in Patent Application No. 2008-222132.

*Primary Examiner* — Jacob C. Coppola
(74) *Attorney, Agent, or Firm* — Oblon, McClelland, Maier & Neustadt, L.L.P.

(57) ABSTRACT

An image forming apparatus for executing an application constituted by one or more program modules, includes a license target identification information generating unit configured to generate license target identification information used for identifying which of the program modules are targets of license management, and to store the license target identification information in a storage device, wherein the license target identification information is generated based on one or more program module information items each being associated with one of the program modules to indicate whether the corresponding program module is a target of license management; and a license determination unit configured to determine, in response to an input of a usage request to use the application, whether a license is present, wherein the determination is made only for one or more of the program modules identified as being the targets of license management based on the license target identification information.

19 Claims, 12 Drawing Sheets

(56) References Cited

U.S. PATENT DOCUMENTS

| | | | |
|---|---|---|---|
| 7,650,492 B2* | 1/2010 | Sherwani et al. | 713/151 |
| 7,984,515 B1* | 7/2011 | Patsenker et al. | 726/31 |
| 2001/0051928 A1* | 12/2001 | Brody | 705/52 |
| 2002/0082997 A1* | 6/2002 | Kobata et al. | 705/51 |
| 2003/0159055 A1* | 8/2003 | Robbins et al. | 713/193 |
| 2004/0127196 A1* | 7/2004 | Dabbish et al. | 455/411 |
| 2004/0193913 A1* | 9/2004 | Han et al. | 713/200 |
| 2004/0205261 A1* | 10/2004 | Osada | 710/8 |
| 2004/0260765 A1* | 12/2004 | Re et al. | 709/202 |
| 2005/0021971 A1* | 1/2005 | Patankar et al. | 713/176 |
| 2005/0076334 A1* | 4/2005 | Demeyer | 717/177 |
| 2005/0222916 A1* | 10/2005 | Ohbitsu | 705/26 |
| 2006/0053182 A1* | 3/2006 | Sen et al. | 707/204 |
| 2007/0009230 A1* | 1/2007 | Tanaka | 386/94 |
| 2007/0150294 A1* | 6/2007 | Rusman et al. | 705/1 |
| 2007/0229876 A1* | 10/2007 | Takashima | 358/1.14 |
| 2007/0238450 A1* | 10/2007 | Hogberg | 455/418 |
| 2008/0010361 A1* | 1/2008 | Jacobs et al. | 709/218 |
| 2008/0040701 A1* | 2/2008 | Stern | 717/100 |
| 2008/0098465 A1* | 4/2008 | Ramakrishna et al. | 726/5 |
| 2008/0167954 A1* | 7/2008 | Kawakami | 705/14 |
| 2008/0184348 A1* | 7/2008 | Tanaka | 726/6 |
| 2008/0215758 A1* | 9/2008 | Gerdes et al. | 709/248 |
| 2008/0235664 A1* | 9/2008 | Carbone et al. | 717/120 |
| 2008/0243698 A1* | 10/2008 | Tanaka | 705/57 |
| 2008/0282360 A1* | 11/2008 | Bahar | 726/30 |
| 2009/0150865 A1* | 6/2009 | Young et al. | 717/120 |

FOREIGN PATENT DOCUMENTS

| | | |
|---|---|---|
| JP | 2006-31169 A | 2/2006 |
| JP | 2006-129163 | 5/2006 |
| JP | 2007-65985 | 3/2007 |
| JP | 2008-16013 | 1/2008 |
| JP | 2008-104143 | 5/2008 |
| JP | 2008-134702 A | 6/2008 |

* cited by examiner

FIG.5

| APPLICATION ID | MACHINE NUMBER | FUNCTIONS | EXPIRATION DATE |
|---|---|---|---|

FIG.7

| | IDENTIFIER | FILE NAME | DISPLAY NAME | TIME/DATE |
|---|---|---|---|---|
| FUNCTION MODULE A | AAA | BBB | CCC | DDD |
| FUNCTION MODULE B | WWW | XXX | YYY | ZZZ |

170

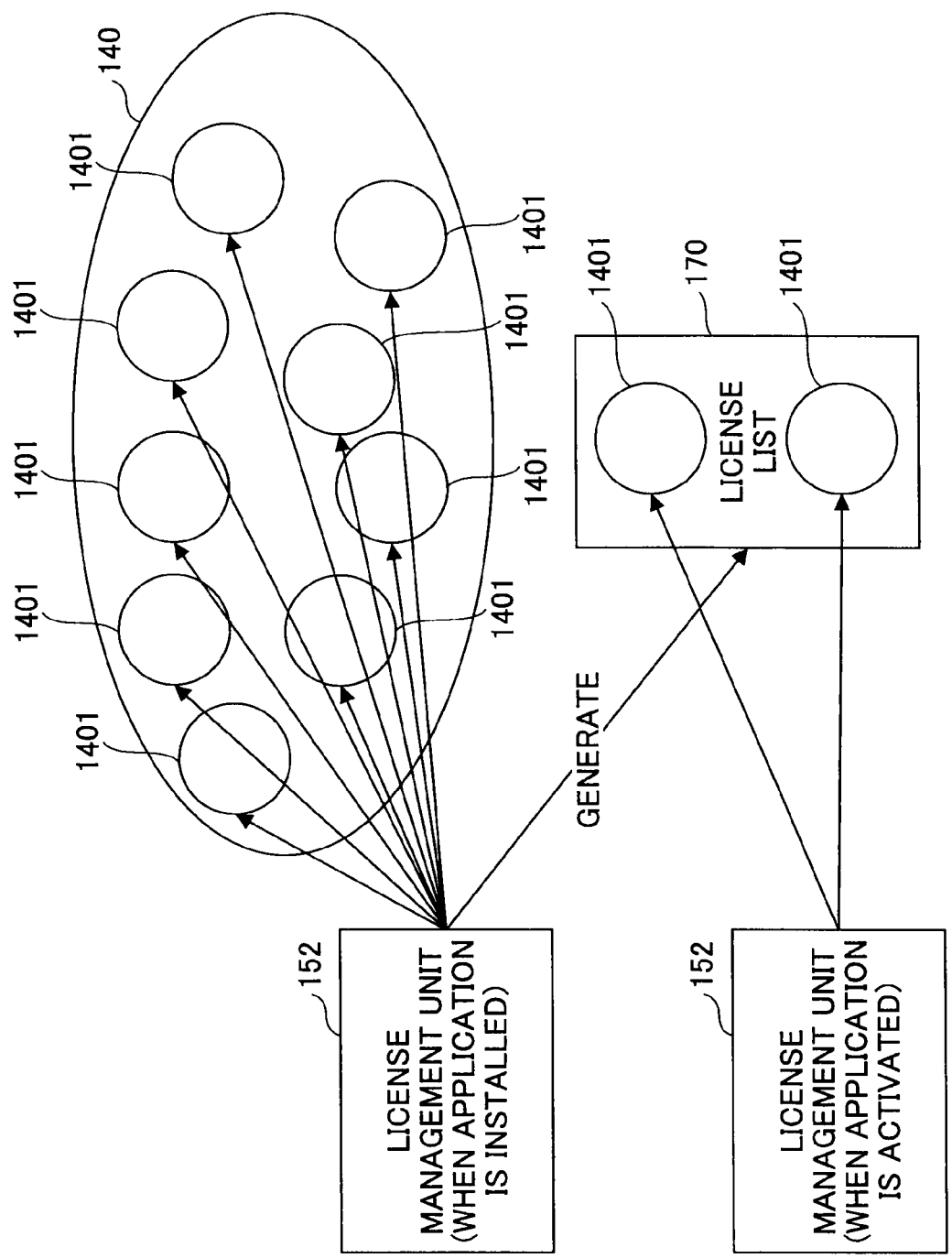

APPARATUS, LICENSE DETERMINING METHOD, RECORDING MEDIUM

BACKGROUND OF THE INVENTION

1. Field of the Invention

The present invention relates to image forming apparatuses, license determining methods, and recording media, and more particularly to an image forming apparatus, a license determining method, and a recording medium capable of executing an application constituted by plural program modules.

2. Description of the Related Art

In recent years, an image forming apparatus typically referred to as a multifunction peripheral or a composite machine, in which a new application can be developed and installed after shipment, has become commonplace. If licenses of such applications can be provided in accordance with the users' usage formats, users can enjoy increased convenience, and vendors of the applications can expect increased business opportunities.

For example, patent document 1 discloses a license managing method for limiting the image forming apparatuses that can use a certain application. According to the technology disclosed in patent document 1, the charged fee can be changed in accordance with the number of apparatuses using the application. Furthermore, unauthorized usage, which is done by illegally copying the application, can be prevented effectively.

Patent Document 1: Japanese Laid-Open Patent Application No. 2008-016013

Each application is not necessarily constituted by a single program module. The application may be constituted by plural program modules that have been modularized according to different functions. If licenses for such applications can be provided in units of program modules, it is possible to limit/allow the usage of some of the functions included in a single application. Accordingly, a wider variety of product formats can be constituted.

However, when licenses are provided in units of program modules, the license needs to be checked (license-check needs to be performed) for each program module when the application is activated. Thus, in a case of an extensive application including a large number of program modules, a significant amount of time will be required for checking the license. Consequently, the time taken for activating the application may exceed an allowable range.

SUMMARY OF THE INVENTION

The present invention provides an image forming apparatus, a license determining method, and a recording medium, in which one or more of the above-described disadvantages are eliminated.

A preferred embodiment of the present invention provides an image forming apparatus, a license determining method, and a recording medium, capable of appropriately reducing the time required to activate an application when the license of the application is checked for each of the program modules constituting the application.

According to an aspect of the present invention, there is provided an image forming apparatus for executing an application constituted by one or more program modules, including a license target identification information generating unit configured to generate license target identification information used for identifying which of the program modules are targets of license management, and to store the license target identification information in a storage device, wherein the license target identification information is generated based on one or more program module information items each being associated with one of the program modules to indicate whether the corresponding program module is a target of license management; and a license determination unit configured to determine, in response to an input of a usage request to use the application, whether a license is present, wherein the determination is made only for one or more of the program modules identified as being the targets of license management based on the license target identification information.

According to an aspect of the present invention, there is provided a license determining method performed by an image forming apparatus for executing an application constituted by one or more program modules, the license determining method including a license target identification information generating step of generating license target identification information used for identifying which of the program modules are targets of license management, and storing the license target identification information in a storage device, wherein the license target identification information is generated based on one or more program module information items each being associated with one of the program modules to indicate whether the corresponding program module is a target of license management; and a license determination step of determining, in response to an input of a usage request to use the application, whether a license is present, wherein the determination is made only for one or more of the program modules identified as being the targets of license management based on the license target identification information.

According to an aspect of the present invention, there is provided a computer-readable recording medium having recorded therein instructions for causing a computer to function as an image processing apparatus to perform a procedure for executing an application constituted by one or more program modules, the procedure including a license target identification information generating step of generating license target identification information used for identifying which of the program modules are targets of license management, and storing the license target identification information in a storage device, wherein the license target identification information is generated based on one or more program module information items each being associated with one of the program modules to indicate whether the corresponding program module is a target of license management; and a license determination step of determining, in response to an input of a usage request to use the application, whether a license is present, wherein the determination is made only for one or more of the program modules identified as being the targets of license management based on the license target identification information.

According to one embodiment of the present invention, an image forming apparatus, a license determining method, and a recording medium are provided, which are capable of appropriately reducing the time required to activate an application when the license of the application is checked for each of the program modules constituting the application.

According to an aspect of the present invention, there is described an apparatus for executing an application constituted by one or more program modules. Included in the apparatus is a controller circuit that is programmed to implement a license management unit by being programmed to generate license target identification information used for identifying which of the program modules are targets of license management, and to store the license target identification information in a storage device, wherein the license target identification information is generated based on one or more program module information items each being associated with one of the program modules to indicate whether the corresponding program module is a target of license management. The controller circuit is also programmed to implement the license management unit by being programmed to determine, in response to an input of a usage request to use the application, whether a license is present, wherein the determination is made only for one or more of the program modules identified as being the targets of license management based on the license target identification information. Moreover, the controller circuit is further programmed to implement an authenticity determination unit by being programmed to determine, in response to the input of the usage request to use the application, whether the license target identification information is authentic.

BRIEF DESCRIPTION OF THE DRAWINGS

Other objects, features and advantages of the present invention will become more apparent from the following detailed description when read in conjunction with the accompanying drawings, in which:

FIG. 5 illustrates a configuration of a license key;

FIG. 7 illustrates an example of a license list;

FIGS. 11A and 11B are for describing why the operation of activating the SDK application can be accelerated by using a license list.

DETAILED DESCRIPTION OF THE PREFERRED EMBODIMENTS

A description is given, with reference to the accompanying drawings, of embodiments of the present invention.

Figure 1:
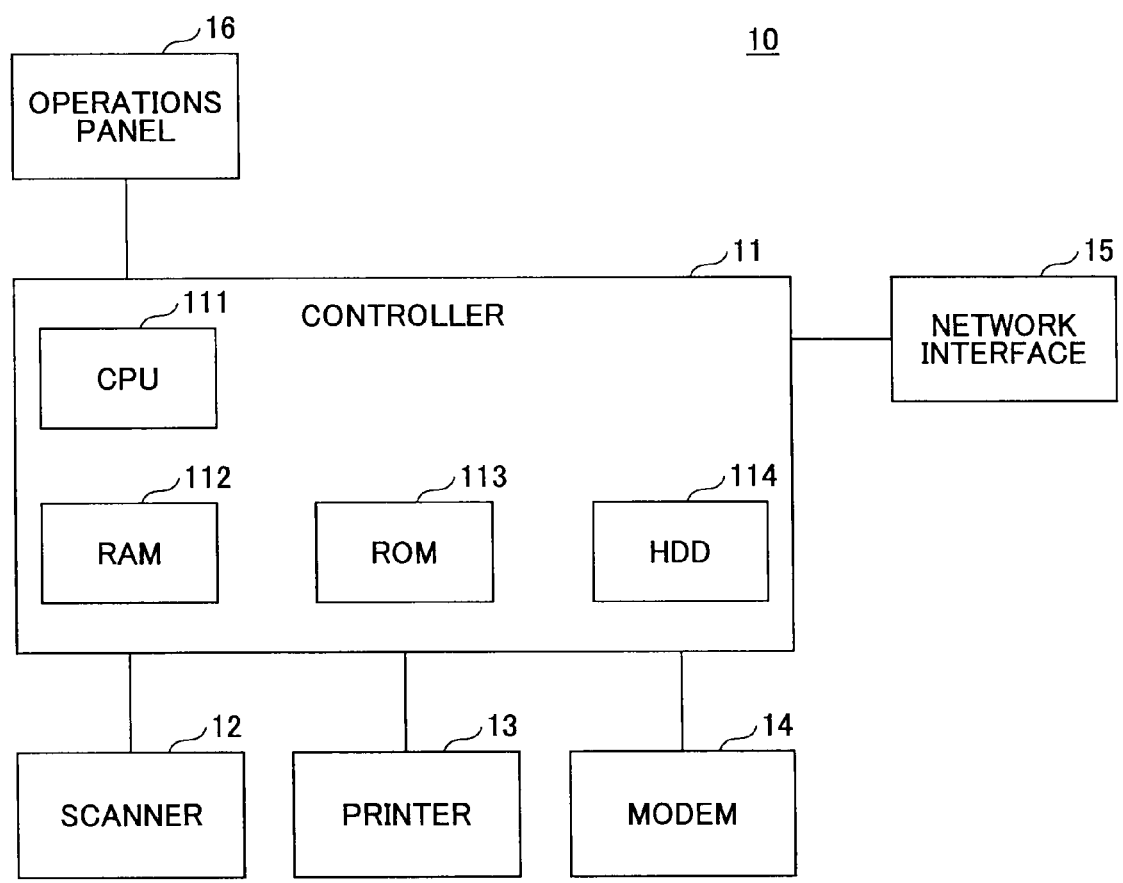
FIG. 1 illustrates a hardware configuration of an image forming apparatus according to an embodiment of the present invention.

FIG. 1 illustrates a hardware configuration of an image forming apparatus according to an embodiment of the present invention. As shown in FIG. 1, an image forming apparatus 10 includes hardware resources such as a controller 11, a scanner 12, a printer 13, a modem 14, a network interface 15, and an operations panel 16.

The controller 11 includes a central processing unit (CPU) 111, a random-access memory (RAM) 112, a read-only memory (ROM) 113, and a hard disk drive (HDD) 114. The ROM 113 records various programs and data used by the programs. The RAM 112 is used as a storage area for loading programs and a work area of the loaded programs. The CPU 111 processes the programs loaded in the RAM 112 to implement various functions. The HDD 114 records programs and various data items used by the programs.

The scanner 12 is a hardware resource for scanning an original to obtain image data. The printer 13 is a hardware resource for printing the image data onto a sheet. The modem 14 is a hardware resource for connecting the image forming apparatus 10 to a telephone line so that image data can be transmitted and received by facsimile. The network interface 15 is a hardware resource for connecting the image forming apparatus 10 to a network (wired or wireless) such as a Local Area Network (LAN). The operations panel 16 is a hardware resource including buttons and/or a liquid crystal display panel for receiving input from the user or notifying information to the user.

Figure 2:
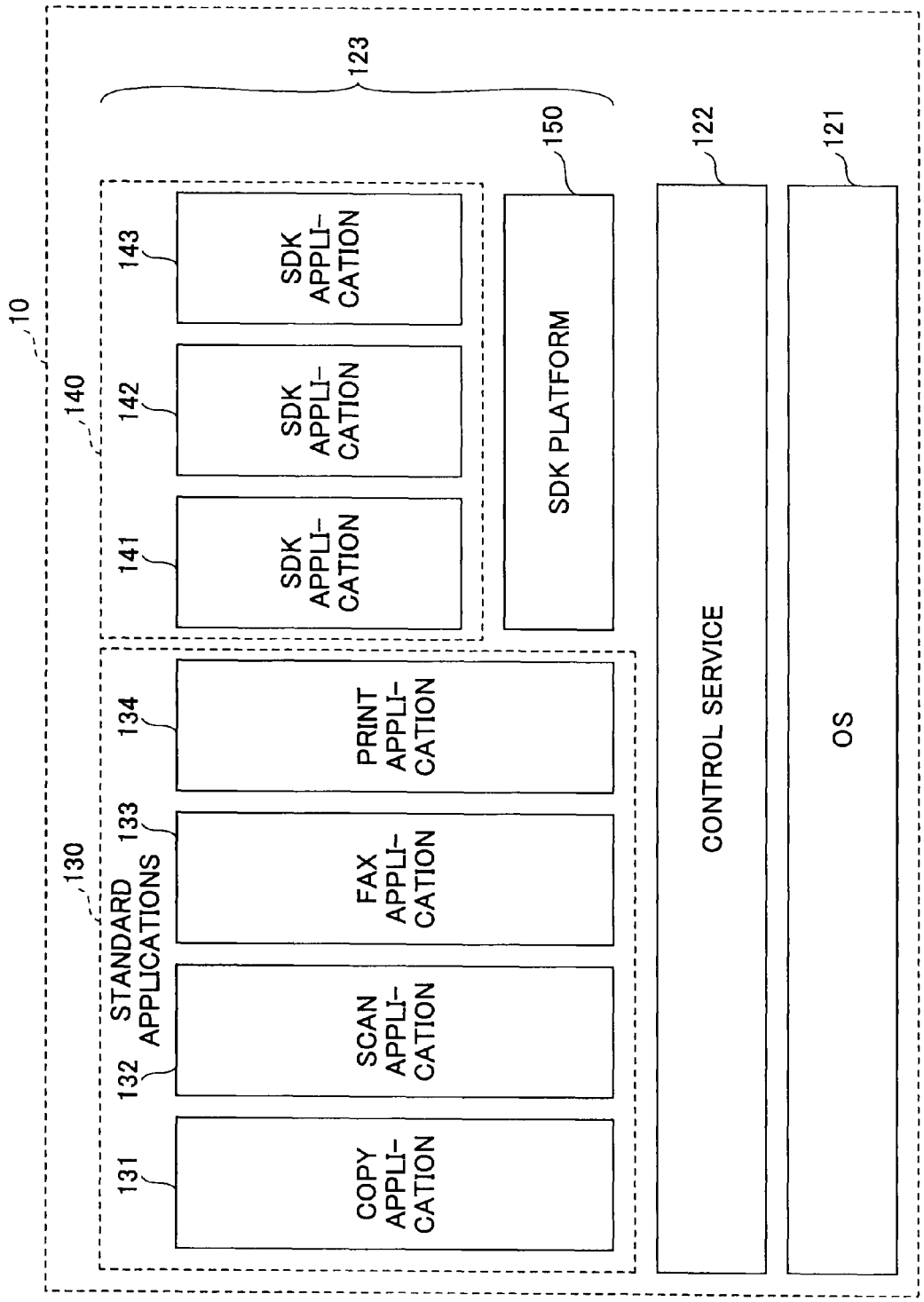
FIG. 2 illustrates a software configuration of the image forming apparatus according to an embodiment of the present invention.

FIG. 2 illustrates a software configuration of the image forming apparatus according to an embodiment of the present invention. As shown in FIG. 2, the image forming apparatus 10 includes software resources such as an operating system (OS) 121, a control service 122, and applications 123.

The OS 121 is, for example, UNIX (registered trademark), which activates the software resources in parallel, in units of processes.

The control service 122 is a group of software modules that provides a common service to upper level applications for controlling various hardware resources. For example, the control service 122 may provide a means for controlling the scanner 12 or the printer 13, and a communication means used via the modem 14 or the network interface 15.

The applications 123 are programs for causing the image forming apparatus 10 to execute various jobs requested by the user, with the use of the control service 122 and the OS 121. The applications 123 are broadly classified into standard applications 130 and Software Development Kit (SDK) applications 140.

The standard applications 130 are pre-installed in the image forming apparatus 10 as standard equipment (the image forming apparatus 10 is shipped with the standard applications 130). The examples of the standard applications 130 shown in FIG. 2 are a copy application 131 for controlling copy jobs, a scan application 132 for controlling scan jobs, a fax application 133 for controlling fax transmission jobs, and a print application 134 for controlling print jobs.

The SDK applications 140 are applications developed with the use of a dedicated SDK for the image forming apparatus 10, and the SDK applications 140 operate on an SDK platform 150. With such a configuration, new applications can be added to the image forming apparatus 10 after shipment with the use of a dedicated SDK. For example, FIG. 2 shows three SDK applications 140, i.e., SDK applications 141, 142, and 143. The SDK applications 140 in the image forming apparatus 10 can be activated when the corresponding license keys have been acquired. The data of a license key can be acquired by purchasing the usage rights to the SDK application 140. In the present embodiment, the SDK application 140 is a program written in the Java (registered trademark) language. However, the SDK application 140 is not limited to a program described in the Java (registered trademark) language when implementing the present invention.

The SDK platform 150 is a software resource for providing an operation environment for the SDK applications 140. For example, the SDK platform 150 may include a group of classes provided as standard equipment in a Java (registered trademark) virtual machine or Java (registered trademark) Micro Edition (ME), or a group of classes wrapping the functions of the control service 122. Furthermore, the SDK platform 150 manages the licenses of the SDK applications 140. For example, the SDK platform 150 manages license keys of the SDK applications 140 and controls the operation of activating the SDK applications 140 based on the license keys.

Figure 3:
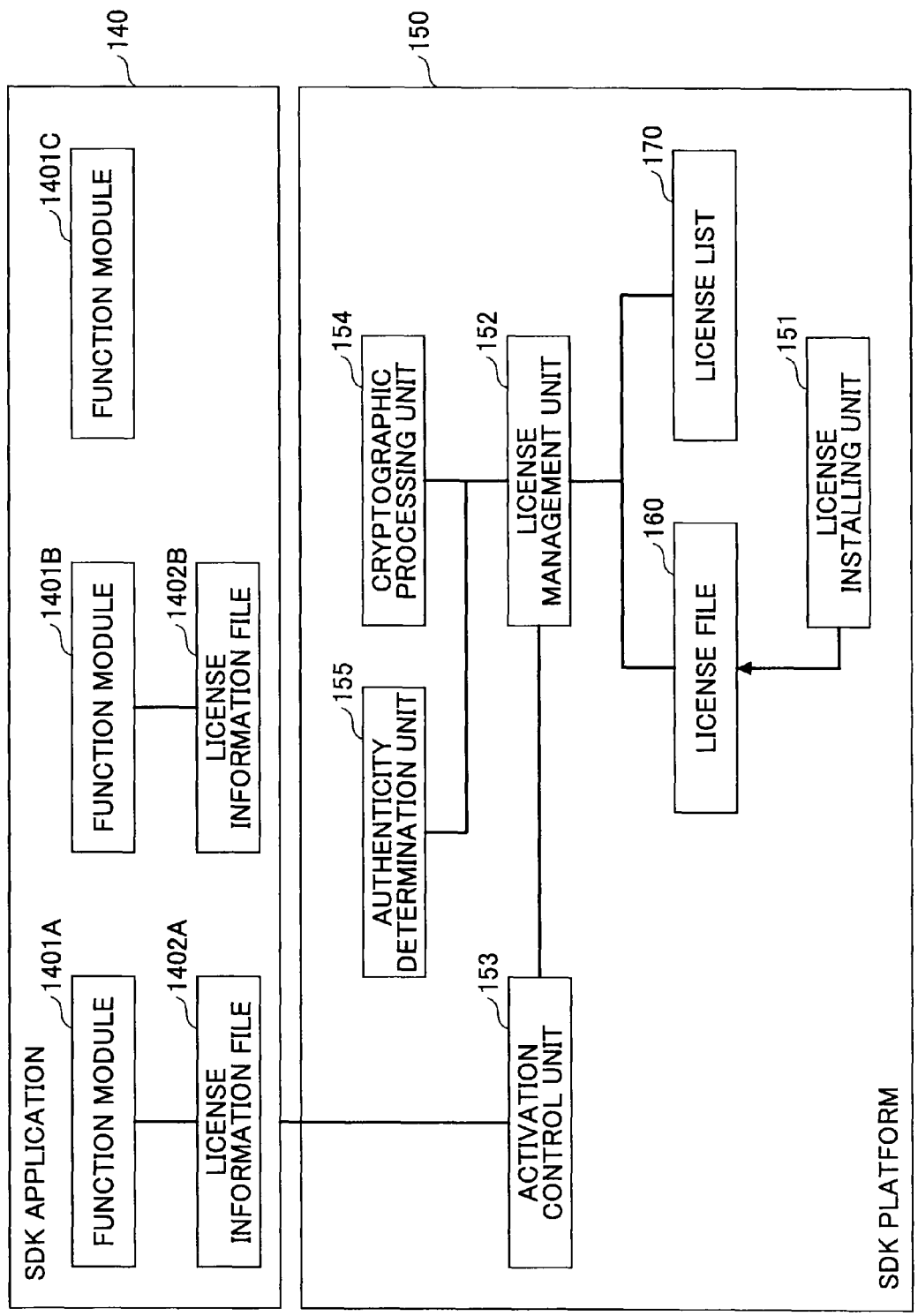
FIG. 3 illustrates configurations of a license managing function of a Software Development Kit (SDK) platform and an SDK application.

FIG. 3 illustrates configurations of the license managing function of the SDK platform and the SDK application.

As shown in FIG. 3, each SDK application 140 includes one or more function modules (for example, a program module such as a Java (registered trademark) Archive (JAR)), and a license information file accompanying (corresponding to) each function module. There may be function modules that are not accompanied by license information files. Each function module implements one of the functions constituting the jobs executed by the SDK application 140, to which the function module belongs. The license information file includes information (license information) pertaining to the license of the corresponding function module. For example, the license information includes an identifier of the function module (function name), a file name of the function module, and a display name of the function module (display character string).

The SDK application 140 includes function modules 1401A, 1401B, and 1401C (hereinafter, may also be collectively referred to as "function module 1401"). Furthermore, the SDK application 140 includes license information files 1402A and 1402B (hereinafter, may also be collectively referred to as "license information file 1402"). The license information file 1402A accompanies the function module 1401A. The license information file 1402B accompanies the function module 1401B. The function module 1401C is not accompanied by a license information file. This means that the function module 1401C is not a target of the license (does not require license-check (license-free)).

The SDK platform 150 includes a license installing unit 151, a license management unit 152, an activation control unit 153, a cryptographic processing unit 154, and an authenticity determination unit 155.

The license installing unit 151 acquires a license key from a computer connected via a network, stores the license key in a license file 160, and saves the license file 160 in the HDD 114.

The activation control unit 153 controls the operation of activating and ending the SDK application 140. When activating the SDK application 140, the activation control unit 153 refers to the license management unit 152 to inquire about the license state of the SDK application 140, and controls, based on the license state, the operation of activating the SDK application 140 (loading the SDK application 140 into the RAM 112) in units of function modules 1401.

The license management unit 152 manages the license file 160 and generates a license list 170. One license list 170 is provided for each SDK application 140. Therefore, when plural SDK applications 140 are installed, plural license lists 170 are generated accordingly. Each license list 170 is a list of license information items stored in the license information files 1402 included in the corresponding SDK application 140. Furthermore, the license management unit 152 determines whether the function module 1401 (function modules 1401A and 1401B in FIG. 3) that is a license-target can be activated with a license key stored in the license file 160. This determination is made based on the license list 170 corresponding to the SDK application 140 whose license state has been inquired about by the activation control unit 153. The license management unit 152 sends the determination results to the activation control unit 153 in response to the inquiry.

When storing the license list 170 generated by the license management unit 152, the cryptographic processing unit 154 encrypts the license list 170. When the encrypted license list 170 is to be used, the cryptographic processing unit 154 decrypts the encrypted license list 170. The license list 170 is prevented from being altered by the cryptographic processing unit 154.

The authenticity determination unit 155 determines whether the license list 170 has been altered.

The processing procedures of the image forming apparatus 10 are described as follows.

Figure 4:
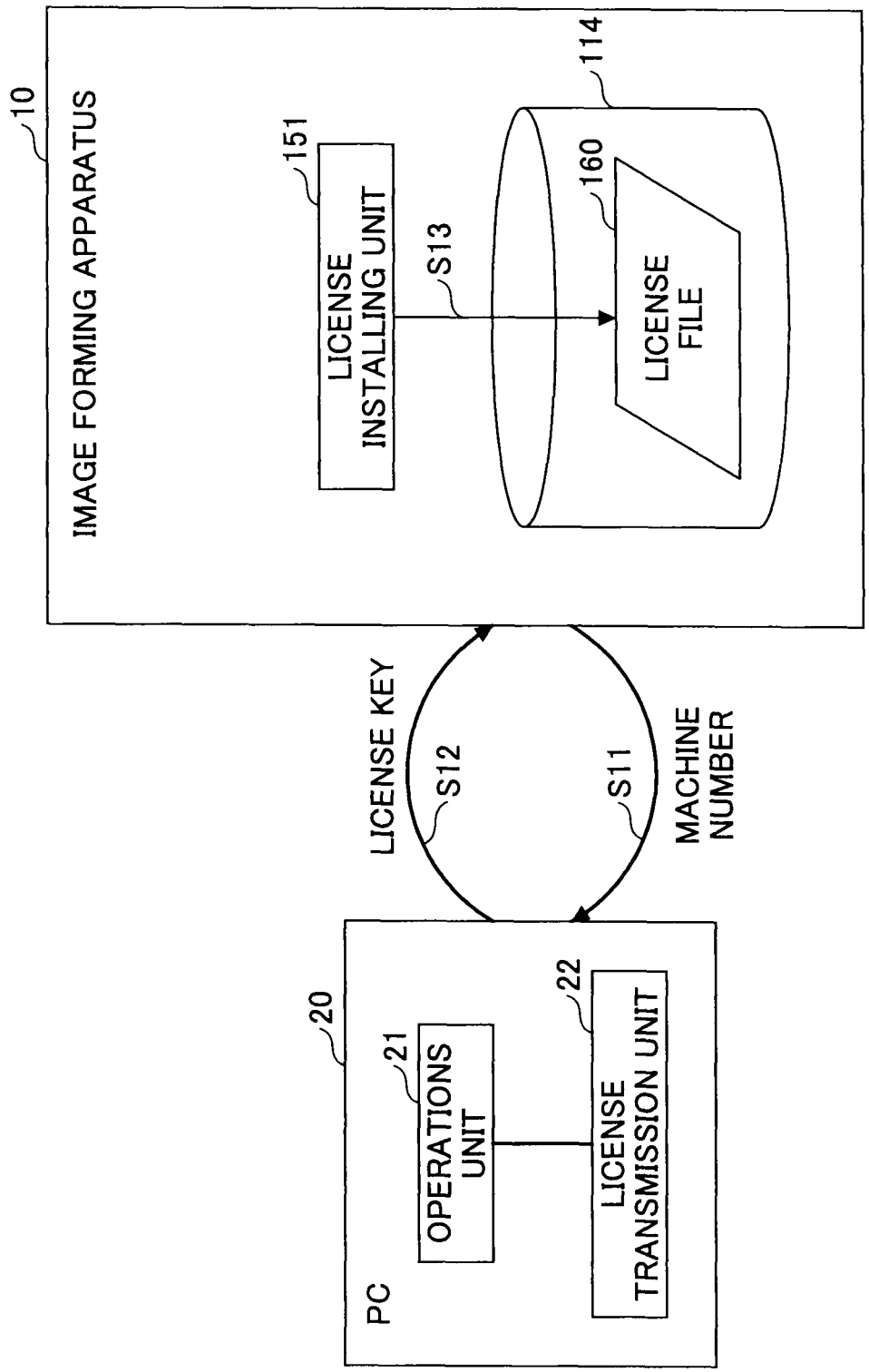
FIG. 4 illustrates a procedure of installing a license key in the image forming apparatus.

FIG. 4 illustrates the procedure of installing a license key in the image forming apparatus. A personal computer (PC) 20 shown in FIG. 4 is connected to the image forming apparatus 10 via a network. The PC 20 includes an operations unit 21 and a license transmission unit 22.

The operations unit 21 receives, from a user, input of a product key of the SDK application 140 that is to be used in the image forming apparatus 10 (the SDK application 140 for which the license key is issued).

The product key is identification information that is uniquely assigned to a product that can be identified by a combination of the SDK application 140 and the function module 1401. For example, for products including the same SDK application 140, different product keys are provided for a product with which only one or some of the function modules 1401 can be used and a product with which all of the function modules 1401 can be used. Furthermore, for products with which only one or some of the function modules 1401 can be used, different product keys are provided depending on which function module 1401 can be used. That is, by inputting a product key, the user can select which function module 1401 of the SDK application 140 is to be used.

In response to the input of the product key, the license transmission unit 22 requests the image forming apparatus 10 to send a machine number. A machine number is uniquely assigned to each image forming apparatus 10 at the time of factory shipment. In response to this request, the license installing unit 151 acquires the machine number of the image forming apparatus 10 from, for example, the ROM 113, and returns the acquired machine number to the license transmission unit 22 (step S11). Subsequently, the license transmission unit 22 sends a license key to the image forming apparatus 10 (step S12). This license key is for granting the usage right to the SDK application 140 and the function module 1401 that are identified by the product key, only in the image forming apparatus 10 that is identified by the received machine number.

FIG. 5 illustrates a configuration of a license key. As shown in FIG. 5, a license key includes an application ID, a machine number of the image forming apparatus 10, functions that can be used (a list of identifiers of the function modules 1401), and an expiration date. With the use of the license key, the image forming apparatus 10 identified by the machine number is allowed to use the functions specified in the license key until the expiration date specified in the license key. The functions are included in the SDK application 140 that is identified by the application ID in the license key. In this manner, the licenses for the SDK application 140 are managed in units of functions (in units of function modules 1401). The application ID, the functions, and the expiration date are values determined by the product key. In the license key, the information items of the application ID, the machine number of the image forming apparatus 10, the functions that can be used, and the expiration date may not only be aligned, but may be encoded or even encrypted. The license key may be generated in the PC 20, or may be generated, in response to a request from the PC 20, in another computer (for example, a server computer that consolidates the license information items in a global environment) that is connected to the PC 20 via a network. With reference to FIG. 4, when the license key is received, the license installing unit 151 stores the license key in the license file 160, and saves the license file 160 in the HDD 114 (step S13).

Figure 6:
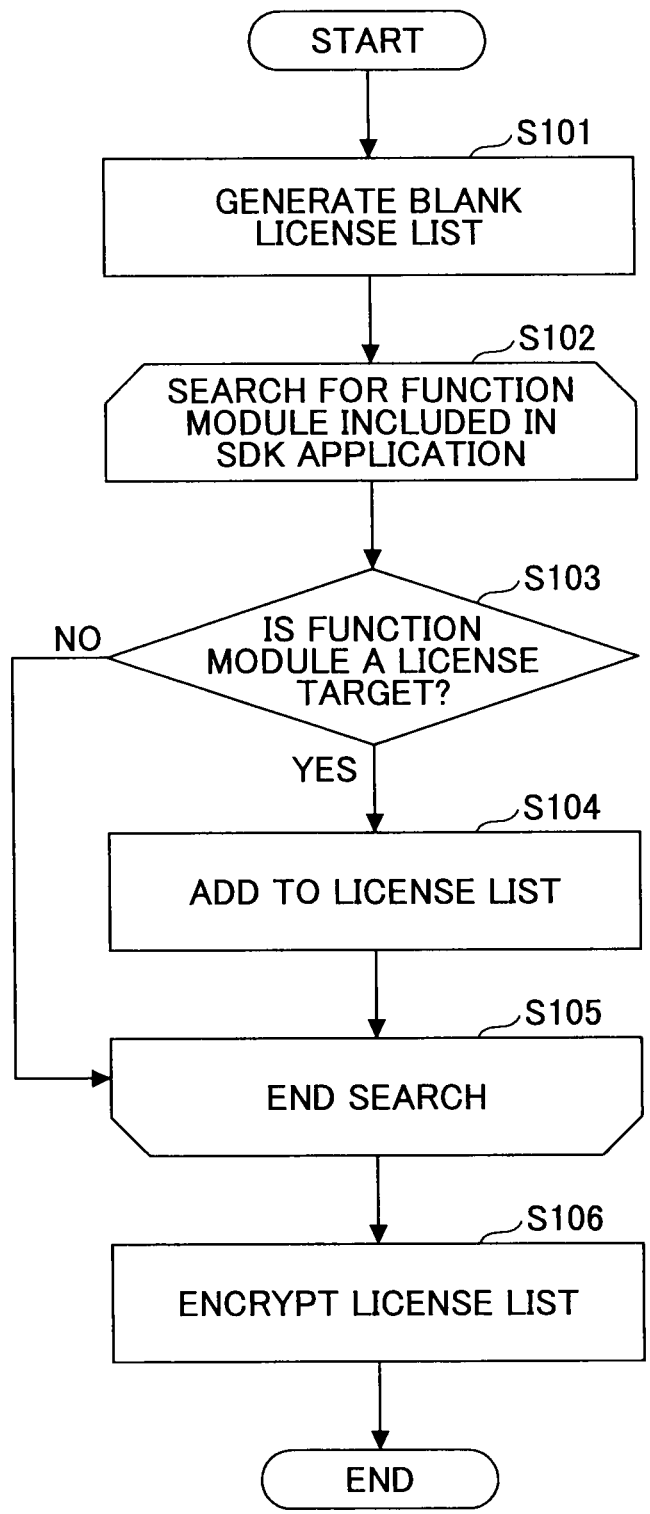
FIG. 6 is a flowchart of a process for generating a license list.

FIG. 6 is a flowchart of a process for generating a license list. The process shown in FIG. 6 is performed for each SDK application 140.

The license management unit 152 generates, in the HDD 114, a blank license list 170 (file) in association with the SDK application 140 (step S101). The method of associating the license list 170 and the SDK application 140 is not limited. For example, an application ID may be included in the license list 170, or the license list 170 may be generated in a folder having the application ID as the folder name.

Next, steps S102 through S105 are performed for each of the function modules 1401. In step S102, the license management unit 152 searches for the function module 1401 included in the SDK application 140 that is the current process target. When the search-found function module 1401 is accompanied by a license information file 1402 (YES in step S103), the license management unit 152 adds the license information stored in the license information file 1402 to the license list 170 (step S104). When the search has been performed for all of the function modules 1401 (step S105), the license management unit 152 causes the cryptographic processing unit 154 to encrypt the generated license list 170 (step S106). The method of encryption is not limited.

A description is given of the process by taking, as an example, the SDK application 140 having the configuration shown in FIG. 3. In step S102, the license management unit 152 searches for the function module 1401A. The function module 1401A is accompanied by the license information file 1402A (YES in step S103). In step S104, the license information stored in the license information file 1402A of the function module 1401A is registered in the license list 170.

Then, the process returns to step S102, where the license management unit 152 searches for the function module 1401B. The function module 1401B is accompanied by the license information file 1402B (YES in step S103). In step S104, the license information stored in the license information file 1402B of the function module 1401B is registered in the license list 170.

Then, the process returns to step S102, where the license management unit 152 searches for the function module 1401C. The function module 1401C is not accompanied by a license information file (NO in step S103), and the search ends in step S105. As a result, the license list 170 shown in FIG. 7 is generated.

FIG. 7 illustrates an example of a license list. As shown in FIG. 7, the identifier (function name) of the function module, the file name of the function module, the display name of the function module, and the time/date are registered in the license list 170 for each function module. The time/date indicates when the function module was licensed (when the license key was issued). The time/date is registered by transferring, to the license list 170, the time/date when the license file 160 including the license key for the corresponding function module was created (this is created in step S104), among the license files 160 of the SDK applications 140 that have been process targets. At this point, the information associated to the license key (for example, the file name of the license file 160 or the license key itself) may also be recorded in the license list 170.

A function module A shown in FIG. 7 corresponds to the function module 1401A shown in FIG. 3. A function module B shown in FIG. 7 corresponds to the function module 1401B shown in FIG. 3. As described above, the function module 1401C is not accompanied by a license information file, and is thus not registered in the license list 170.

Figure 8:
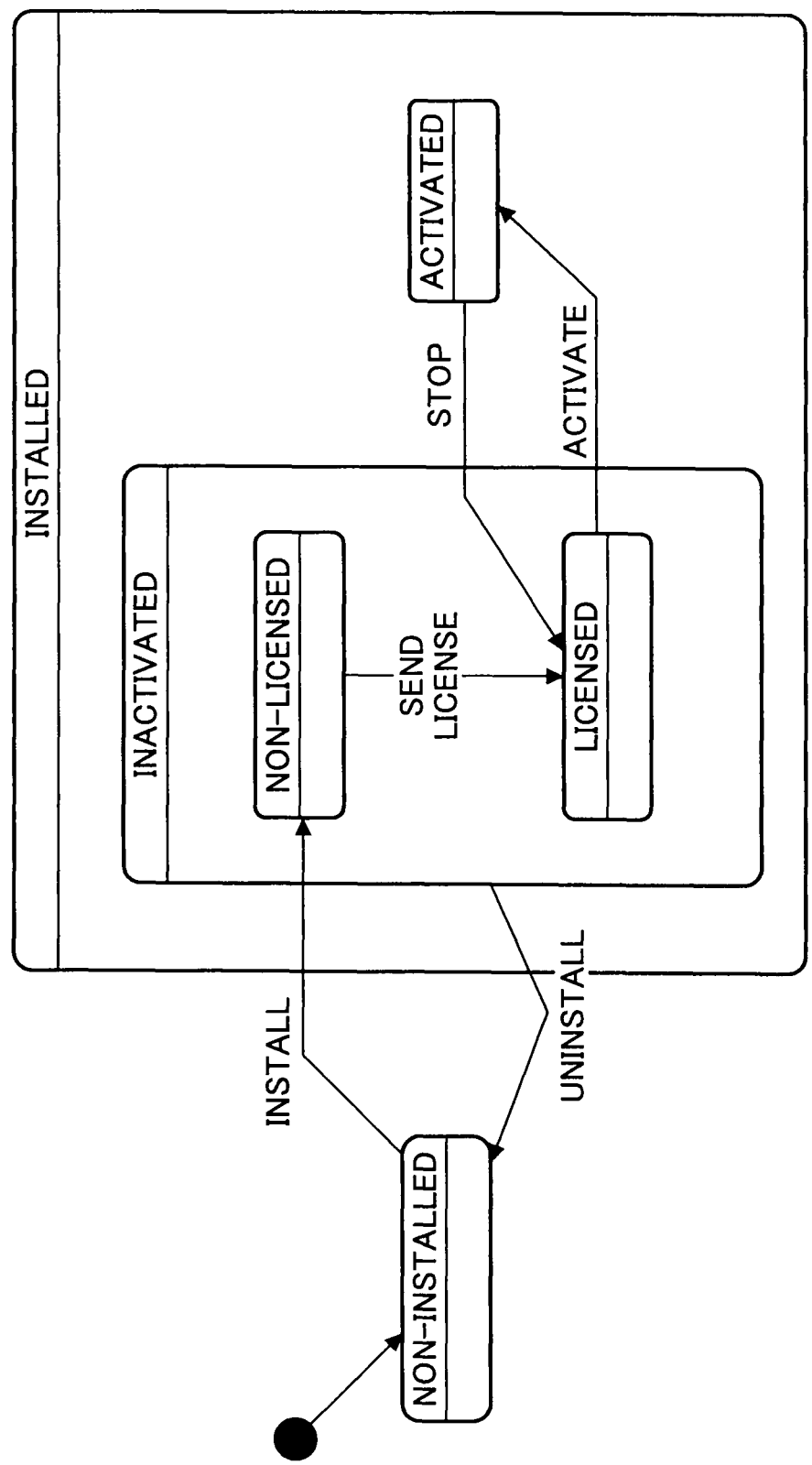
FIG. 8 is a state transition diagram for describing the life cycle of the SDK application according to the present embodiment.

The timing of generating the license list 170 (timing when the process of FIG. 6 is executed) is described. The SDK application 140 has a life cycle as illustrated in FIG. 8. FIG. 8 is a state transition diagram for describing the life cycle of the SDK application according to the present embodiment.

The SDK application 140 is in a non-installed state before it is installed in the image forming apparatus 10, and shifts to an installed state when it is installed. In the installed state, the SDK application 140 is initially in an inactivated state where the SDK application 140 not activated, and also in a non-licensed state where there is no corresponding license key. In this non-licensed state, the SDK application 140 cannot be activated. When a license key is installed from the PC 20 during the non-licensed state, the SDK application 140 shifts to a licensed state. In the licensed state, the SDK application 140 can be activated.

When the SDK application 140 is activated during the licensed state, the SDK application 140 shifts to an activated state. During the activated state, the user can use the licensed functions included in the SDK application 140. When the SDK application 140 is stopped, the SDK application 140 returns to the licensed state. When the SDK application 140 is uninstalled during the inactivated state, the SDK application 140 returns to the non-installed state.

In the above-described life cycle, the license list 170 is generated when the SDK application 140 is installed or when the SDK application 140 is activated.

Figure 9:
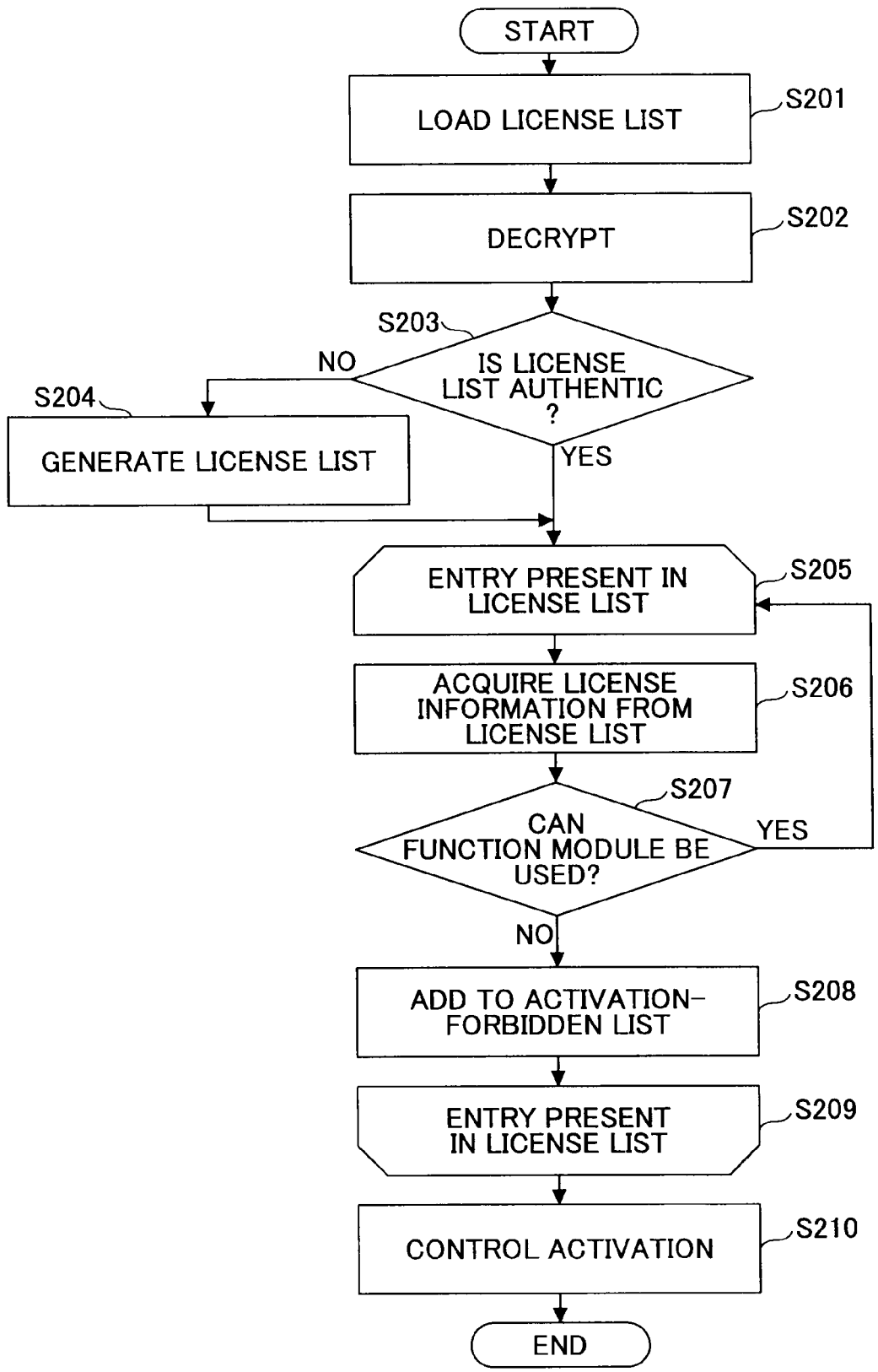
FIG. 9 is a flowchart for describing the processing procedures when activating the SDK application.

FIG. 9 is a flowchart for describing the processing procedures when activating the SDK application 140. When an instruction (usage request) to activate a certain SDK application 140 is received from the user through the operations panel 16, the activation control unit 153 reports, to the license management unit 152 of the application ID, the SDK application 140 for which the usage request has been made (the requested SDK application 140). Furthermore, the activation control unit 153 refers to the license management unit 152 to inquire about the license state of the SDK application 140. In response to this inquiry, a process shown in FIG. 9 is started.

First, the license management unit 152 loads the license list 170 corresponding to the requested SDK application 140 into the RAM 112 (step S201). The license management unit 152 causes the cryptographic processing unit 154 to decrypt the license list 170 (step S202). The license management unit 152 causes the authenticity determination unit 155 to determine the authenticity of the license list 170 (step S203). The authenticity determination unit 155 determines the authenticity of the license list 170 by, for example, checking whether the data format of the license list 170 conforms with a predetermined format after the license list 170 has been successfully decrypted by the cryptographic processing unit 154. When the license list 170 has not been successfully decrypted or when the license list 170 does not conform with a predetermined format, the authenticity determination unit 155 determines that the license list 170 is inauthentic (fraudulent)

An electronic signature may be used for determining the authenticity of the license list 170. For example, when the license list 170 is generated, a hash value is also generated for the license list 170 before the license list 170 is encrypted, and the hash value is saved in association with the license list 170. The authenticity determination unit 155 determines whether the license list 170 has been altered (determines the authenticity) by comparing the hash value of the license list 170 decrypted at step S202 with the hash value saved in association with the license list 170.

When the authenticity determination unit 155 has determined that the license list 170 is inauthentic (NO in step S203), the license management unit 152 executes the process shown in FIG. 6 for the requested SDK application 140, to generate a license list 170 once again (step S204). The process of generating a license list 170 is executed at step S204 also when there is no license list 170 in step S201.

When the authenticity determination unit 155 has determined that the license list 170 is authentic (YES in step S203), or after step S204, the license management unit 152 identifies, based on the license list 170, the function modules 1401 in the requested SDK application 140 that cannot (are not allowed to) be activated (steps S205 through S209).

In step S206, the license management unit 152 acquires one entry (license information corresponding to one function module 1401) from the license list 170 (step S206). The license management unit 152 determines whether the function module 1401 corresponding to the license information can be used (activated), based on the identifier included in the acquired license information and the license key stored in the license file 160 corresponding to the SDK application 140 (step S207).

That is, as long as the license key is effective and the identifier is included under the "function" items in the license key, it is determined that the function module 1401 can be used. Otherwise (including cases where there is no license file 160 corresponding to the SDK application 140), it is determined that the function module 1401 cannot be used. When the license key is effective, it means that the machine number in the license key corresponds to the machine number of the image forming apparatus 10, and the license key has not yet expired.

When the license management unit 152 determines that the function module 1401 cannot be used (NO in step S207), the license management unit 152 adds the identifier of the function module 1401 to an activation-forbidden list (a list of function modules that cannot be activated) (step S208).

When the process from step S206 through step S208 has been completed for all of the entries (license information items) included in the license list 170, the license management unit 152 outputs the activation-forbidden list to the activation control unit 153, as information indicating the license state of the requested SDK application 140 (step S209).

Then, the activation control unit 153 controls the operation of activating the SDK application 140 based on the activation-forbidden list (step S210). Specifically, the activation control unit 153 limits (prevents) the activation or usage of a function module 1401 included in the activation-forbidden list. Accordingly, usage of one or some of the functions of the SDK application 140 will be limited. For example, in a case where the SDK application 140 is related to copy jobs, a function of a color copy job cannot be used.

The process of FIG. 9 is described in more detail based on the SDK application 140 shown in FIG. 3. With reference to FIG. 3, for example, it is assumed that only the function module 1401A is licensed by the license key included in the license file 160. In this case, when a request to activate the SDK application 140 is made, the function module 1401B is included in the activation-forbidden list, and is thus prevented from being activated. Accordingly, only the functions of the function module 1401A and the function module 1401C can be used. The function of the function module 1401C can be used because the function module 1401C is not a target of license management.

FIG. 9 describes an example of reporting the license state to the activation control unit 153 with the use of an activation-forbidden list of the SDK application 140. However, the license management unit 152 may report the license state to the activation control unit 153 with the use of a list of function modules that can be activated.

As described above, the image forming apparatus 10 according to the present embodiment generates, in advance, the license list 170 of function modules 1401 requiring the license-check. Accordingly, when the SDK application 140 is activated, the license is checked only for the function modules 1401 entered in the license list 170. Thus, the number of times of performing the license-check can be reduced, thereby appropriately reducing the time required to activate the entire SDK application 140.

Figure 10:
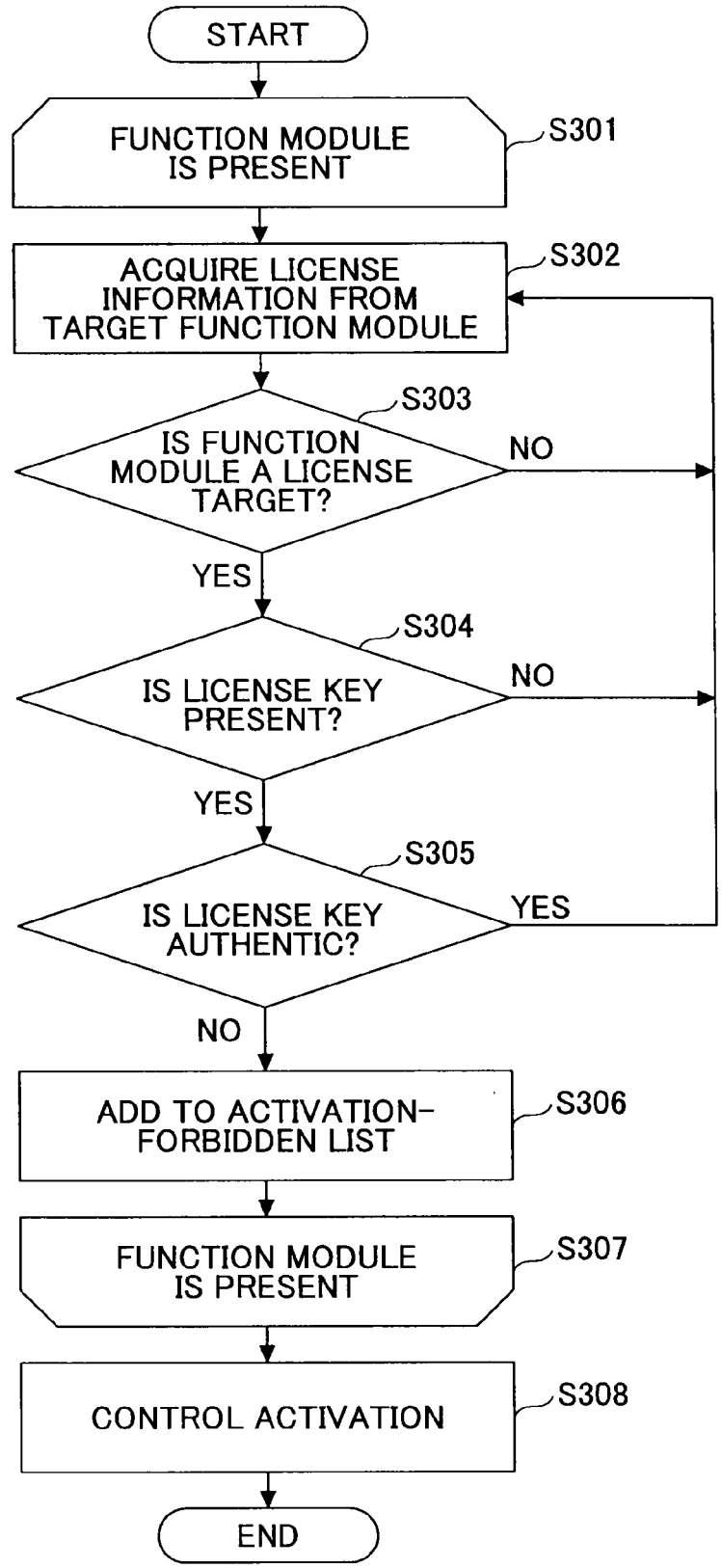
FIG. 10 is a flowchart for describing the processing procedures when activating an SDK application when there is no license list.

FIG. 10 is a flowchart for describing the processing procedures when activating an SDK application when there is no license list.

At steps S301 through S305, it is determined whether a function module 1401 included in the requested SDK application 140 is a license-target. The procedure of determining whether a function module 1401 is a license-target is performed for all of the function modules 1401 included in the requested SDK application 140 (step S303). For a function module 1401 determined as being a license-target, it is determined whether a license key is provided and whether the license key is authentic (steps S304 and S305). When it is determined that a function module 1401 cannot be used, the corresponding function module 1401 is added to a function-forbidden list (step S306). When all of the function modules 1401 have been checked (step S307), the operation of activating the SDK application 140 is controlled based on the results of checking the function modules 1401 (step S308).

Figure 11A:
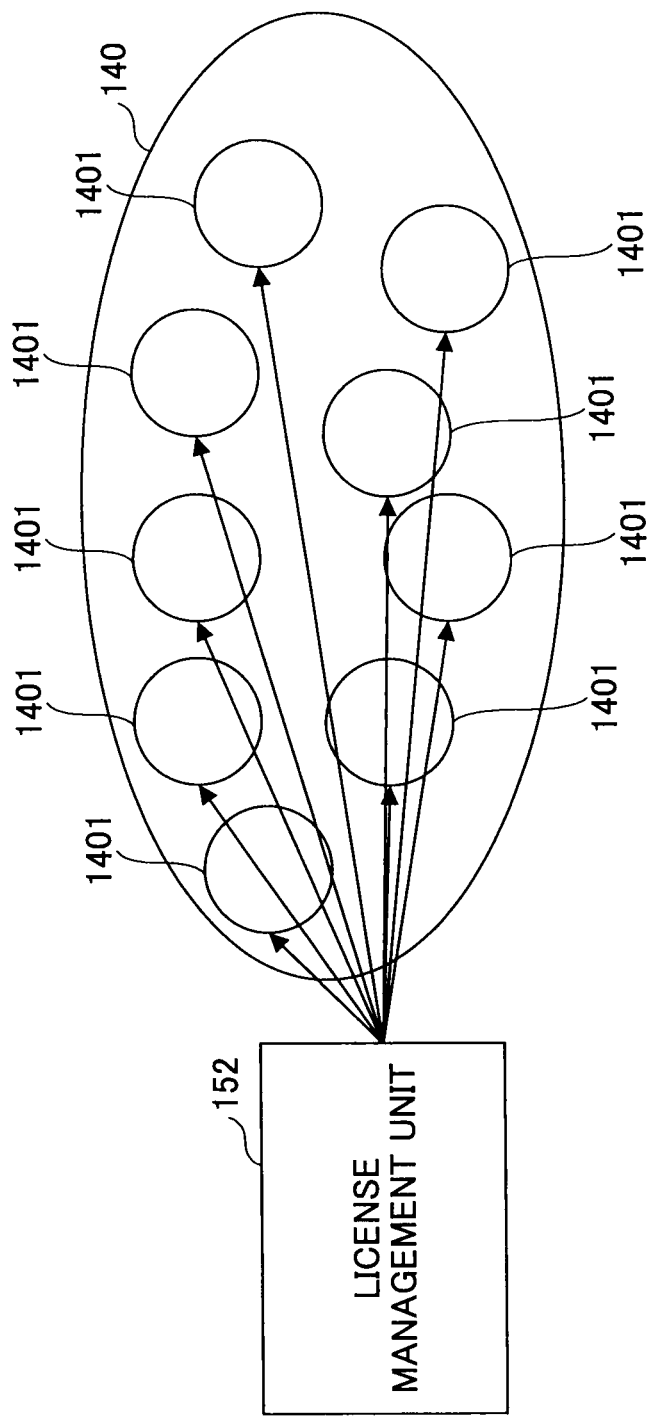

The difference between the process of FIG. 10 and the process executed by the image forming apparatus 10 according to the present embodiment is schematically illustrated in FIGS. 11A and 11B.

FIGS. 11A and 11B are for describing why the operation of activating the SDK application can be accelerated by using a license list.

FIG. 11A illustrates the process of FIG. 10. FIG. 11A illustrates that when the SDK application 140 is activated, the license-check is performed for all of the function modules 1401 of the SDK application 140. In this example, every time the SDK application 140 is activated, the license-check is performed nine times.

Meanwhile, FIG. 11B illustrates the process executed by the image forming apparatus 10 according to the present embodiment. In the present embodiment, when the SDK application 140 is installed, the license-check is performed for all of the function modules 1401 of the SDK application 140, and the license list 170 is generated. FIG. 11B illustrates an example where two function modules 1401 are determined to be targets of a license. Therefore, when the SDK application 140 is activated, the license-check is performed only for these two function modules 1401 that are entered in the license list 170.

As described above, the greater the number of function modules included in the SDK application 140, the more effective an embodiment of the present invention will be. The license list 170 does not necessarily need to be generated when the SDK application 140 is installed. Even if the license list 170 is not generated when the SDK application 140 installed, the license list 170 can be generated when the SDK application 140 is activated for the first time.

Furthermore, the license list 170 is encrypted when being stored, so that it can be checked whether the license list 170 has been altered before using the license list 170. Accordingly, it is possible to appropriately prevent unauthorized users from fraudulently acquiring a license by altering the license list 170 (for example, by deleting an entry from the license list 170 to avoid a license-check performed on the corresponding function module 1401).

Furthermore, even if it is detected that the license list 170 has been altered when the SDK application 140 is activated, the license list 170 can be generated once again, and therefore the SDK application 140 can be smoothly activated within the scope of the license.

In the present embodiment, the license information of the function modules 1401 which are targets of license management is included in the license list 170. However, the license list 170 may be constituted by license information of the function modules 1401 which are not targets of license management. Either way is acceptable as long as the license list 170 can be used to identify which function module 1401 is a target of license management.

The present invention is not limited to the specifically disclosed embodiment, and variations and modifications may be made without departing from the scope of the present invention.

The present application is based on Japanese Priority Patent Application No. 2008-222132, filed on Aug. 29, 2008, the entire contents of which are hereby incorporated herein by reference.

What is claimed is:

1. An apparatus for executing an application constituted by a plurality of program modules, comprising:
   a controller circuit programmed to implement a license management unit by
   being programmed to generate license target identification information used for identifying which of the plurality of program modules are targets of license management, and to store the license target identification information in a storage device, wherein the license target identification information is generated based on one or more program module information items each being associated with one of the plurality of program modules to indicate whether the corresponding program module is a target of license management, and
   being programmed to determine, in response to an input of a usage request to execute the application, whether a license is present, wherein the determination is made only for those program modules of the plurality of program modules, which are identified as being the targets of license management based on the license target identification information.

2. The apparatus according to claim 1, wherein:
   in the event that no license target identification information is stored in the storage device when the usage request to use the application is input, the license management unit generates the license target identification information; and
   the license management unit determines whether the license is present based on the license target identification information that has been generated in response to the input of the usage request.

3. The apparatus according to claim 1, wherein
   the controller circuit is further programmed to implement an authenticity determination unit by being programmed to determine, in response to the input of the usage request to use the application, whether the license target identification information is authentic,
   the license management unit once again generates the license target identification information in the event that the license target identification information is determined as being inauthentic by the authenticity determination unit, and
   the license management unit determines whether the license is present based on the license target identification information that has been once again generated.

4. The apparatus according to claim 1, wherein:
   the license target identification information comprises one or more of the program module information items corresponding to one or more of the program modules identified as being the targets of license management.

5. The apparatus according to claim 1, wherein:
   the license management unit encrypts the license target identification information when storing the license target identification information in the storage device.

6. The apparatus according to claim 1, wherein the determination regarding whether a license is present for only those program modules of the plurality of program modules, which are identified as being the targets of license management based on the license target identification information, is made further in response to receipt of an identification of the application.

7. The apparatus according to claim 1, wherein the controller circuit is programmed to implement the license management unit by being programmed to generate an activation-forbidden list which indicates which program modules are not permitted to be activated in the application.

8. A license determining method performed by an apparatus for executing an application constituted by a plurality of program modules, the license determining method comprising:
   a license target identification information generating step of generating license target identification information used for identifying which of the plurality of program modules are targets of license management, and storing the license target identification information in a storage device, wherein the license target identification information is generated based on one or more program module information items each being associated with one of the plurality of program modules to indicate whether the corresponding program module is a target of license management; and
   a license determination step of determining, in response to an input of a usage request to execute the application, whether a license is present, wherein the determination is made only for those program modules of the plurality of program modules, which are identified as being the targets of license management based on the license target identification information.

9. The license determining method according to claim 8, wherein:
   in the event that no license target identification information is stored in the storage device when the usage request to use the application is input, the license target identification information is generated at the license target identification information generating step; and
   at the license determination step, the determination as to whether the license is present is made based on the license target identification information that has been generated in response to the input of the usage request.

10. The license determining method according to claim 8, further comprising:
    an authenticity determination step of determining, in response to the input of the usage request to use the application, whether the license target identification information is authentic; and a license target identification information re-generating step of once again generating the license target identification information in the event that the license target identification information is determined as being inauthentic at the authenticity determination step, wherein:
at the license determination step, the determination as to whether the license is present is made based on the license target identification information that has been once again generated.

11. The license determining method according to claim 8, wherein:
the license target identification information comprises one or more of the program module information items corresponding to one or more of the program modules identified as being the targets of license management.

12. The license determining method according to claim 8, wherein:
at the license target identification information generating step, the license target identification information is encrypted when storing the license target identification information in the storage device.

13. The license determining method according to claim 8, further comprising:
generating an activation-forbidden list which indicates which program modules are not permitted to be activated in the application.

14. A non-transitory computer-readable recording medium having recorded therein instructions for causing a computer to function as an image processing apparatus to perform a procedure for executing an application constituted by a plurality of program modules, the procedure comprising:
a license target identification information generating step of generating license target identification information used for identifying which of the plurality of program modules are targets of license management, and storing the license target identification information in a storage device, wherein the license target identification information is generated based on one or more program module information items each being associated with one of the plurality of program modules to indicate whether the corresponding program module is a target of license management; and
a license determination step of determining, in response to an input of a usage request to execute the application, whether a license is present, wherein the determination is made only for those program modules of the plurality of program modules, which are identified as being the targets of license management based on the license target identification information.

15. The recording medium according to claim 14, wherein:
in the event that no license target identification information is stored in the storage device when the usage request to use the application is input, the license target identification information is generated at the license target identification information generating step; and
at the license determination step, the determination as to whether the license is present is made based on the license target identification information that has been generated in response to the input of the usage request.

16. The recording medium according to claim 14, wherein the procedure further comprises:
an authenticity determination step of determining, in response to the input of the usage request to use the application, whether the license target identification information is authentic; and
a license target identification information re-generating step of once again generating the license target identification information in the event that the license target identification information is determined as being inauthentic at the authenticity determination step, wherein:
at the license determination step, the determination as to whether the license is present is made based on the license target identification information that has been once again generated.

17. The recording medium according to claim 14, wherein:
the license target identification information comprises one or more of the program module information items corresponding to one or more of the program modules identified as being the targets of license management.

18. The recording medium according to claim 14, wherein:
at the license target identification information generating step, the license target identification information is encrypted when storing the license target identification information in the storage device.

19. The recording medium according to claim 14, further comprising:
generating an activation-forbidden list which indicates which program modules are not permitted to be activated in the application.

\* \* \* \* \*